United States Patent
Xu et al.

(10) Patent No.: US 11,456,910 B1
(45) Date of Patent: *Sep. 27, 2022

(54) CARRIER-PHASE RECOVERY SYSTEM AND METHOD

(71) Applicant: CABLE TELEVISION LABORATORIES, INC., Louisville, CO (US)

(72) Inventors: Mu Xu, Broomfield, CO (US); Zhensheng Jia, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/129,776

(22) Filed: Dec. 21, 2020

Related U.S. Application Data (63) Continuation of application No. 16/412,104, filed on May 14, 2019, now Pat. No. 10,873,493.
(Continued)

(51) Int. Cl.
*H04L 27/34* (2006.01)
*H04L 27/36* (2006.01)
(Continued)

(52) U.S. Cl.
CPC ....... *H04L 27/3455* (2013.01); *H04B 14/008* (2013.01); *H04L 1/0054* (2013.01); *H04L 27/361* (2013.01); *H04L 27/3809* (2013.01)

(58) Field of Classification Search
CPC .............. H04L 27/3455; H04L 27/361; H04L 27/3809; H04L 1/0054; H04B 14/008
See application file for complete search history.

(56) References Cited

U.S. PATENT DOCUMENTS

| | | | |
|---|---|---|---|
| 7,079,574 | B2 | 7/2006 | Rafie et al. |
| 8,477,877 | B2 | 7/2013 | Zhou |
| 8,767,575 | B2 | 7/2014 | Zhang et al. |
| 8,908,809 | B2 | 12/2014 | Zhou et al. |
| 9,496,967 | B1 * | 11/2016 | Castrillon ............. H04L 1/0054 |

(Continued)

OTHER PUBLICATIONS

Bilal, S.M. et al.; Carrier Phase Estimation Through the Rotation Algorithm for 64-QAM Optical Systems; Journal of Lightwave Technology, vol. 33, No. 9, pp. 1766-1773, 1 May 1, 2015.
(Continued)

*Primary Examiner* — Min Jung
(74) *Attorney, Agent, or Firm* — Lathrop GPM LLP (57) ABSTRACT

A carrier-phase recovery method includes: (i) applying a first carrier-phase recovery algorithm to complex-valued symbols of a signal received by a product detector, yielding coarse phase-estimates, the signal being modulated per an M-QAM scheme; (ii) modelling the coarse phase-estimates as a weighted sum of M probability-density functions of an M-component mixture model; (iii) optimizing the M probability-density functions with an expectation-maximization algorithm to yield M optimized probability-density functions; (iv) mapping, based on the M optimized probability-density functions, the coarse phase-estimates to one of M symbols corresponding to the QAM scheme, each coarse phase-estimate mapped to a same symbol belonging to a same one of M clusters; (v) applying a second carrier-phase recovery algorithm to each of the M clusters to generate refined phase-estimates each corresponding to a respective coarse phase-estimate; and (vi) mapping, based on the M optimized probability-density functions, each refined phase-estimate to one of the M symbols.

24 Claims, 5 Drawing Sheets

Related U.S. Application Data (60) Provisional application No. 62/671,490, filed on May 15, 2018.

(51) Int. Cl.
*H04B 14/00* (2006.01)
*H04L 1/00* (2006.01)
*H04L 27/38* (2006.01)

(56) References Cited

U.S. PATENT DOCUMENTS

| | | | |
|---|---|---|---|
| 9,559,786 | B2 | 1/2017 | Millar et al. |
| 9,705,544 | B2 | 7/2017 | Beek et al. |
| 10,270,520 | B2 | 4/2019 | Arapoglou et al. |
| 10,341,030 | B2 | 7/2019 | Castrillon et al. |
| 2005/0213678 | A1 | 9/2005 | Lewis |
| 2013/0089342 | A1 | 4/2013 | Gharan et al. |
| 2015/0215071 | A1 | 7/2015 | Chinnici et al. |
| 2019/0123832 | A1* | 4/2019 | Alic .................. H04B 10/6165 |

OTHER PUBLICATIONS

D. A. Reynolds, T. F. Quatieri, and R. B. Dunn, "Speaker verification using adapted Gaussian mixture models." Digital Signal Processing, vol. 10, No. 1, pp. 19-41, 2000.

Hatsie, T., et al.; Unsupervised learning. In The elements of statistical learning (pp. 4 485-4 585). Springer, New York, NY, 2009.

K. Zhong, J. H. Ke, Y. Gao, and J. C. Cartledge, "Linewidth-tolerant and low-complexity two-stage carrier phase estimation based on modified QPSK partitioning for dual-polarization 16-QAM systems," J. Lightw. Technol., vol. 31, No. 1, pp. 50-57, Jan. 2013.

S. Liu, M. Xu, J. Wang, F. Lu, W. Zhang, H. Tian, and G.-K. Chang, "A multi-level artificial neural network nonlinear equalizer for millimeter-wave mobile fronthaul systems", J. Lightw. Technol., vol. 35, No. 20, pp. 4406-4417, Jun. 2017.

P. Dong, X. Liu, S. Chandrasekhar, L. L. Buhl, R. Aroca, and Y.-K. Chen, "Monolithic silicon photonic integrated circuits for compact 100 + GB/s coherent optical receivers and transmitters," IEEE J. Sel. Topics Quantum Electron., vol. 20, No. 4, pp. 1-8, Jul./Aug. 2014.

S. J. Savory, "Digital coherent optical receivers: Algorithms and subsystems," IEEE J. Sel. Topics Quantum Electron., vol. 16, No. 5, pp. 1164-1179, Sep./Oct. 2010.

X. Zhou, "An improved feed-forward carrier recovery algorithm for coherent receiver with M-QAM modulation format," IEEE Photon. Technol. Lett., vol. 22, pp. 1051-1053, 2010.

Xu, M. et al.; Multi-Stage Machine Learning Enhanced DSP for DP-64QAM Coherent Optical Transmission Systems; 2019 Optical Fiber Communications Conference and Exhibition (OFC), San Diego, CA, USA, 2019, pp. 1-3.

\* cited by examiner

CARRIER-PHASE RECOVERY SYSTEM AND METHOD

CROSS-REFERENCE TO RELATED APPLICATION

This application is a continuation of U.S. patent application Ser. No. 16/412,104, filed on May 14, 2019, which claims priority to U.S. provisional patent application Ser. No. 62/671,490, filed on May 15, 2018, the disclosures of which are incorporated herein by reference in their entirety.

BACKGROUND

Recent developments of digital signal processing (DSP) and photonic integrated circuits significantly boost the capacity and lower the cost of coherent optical communication transceivers for long-haul networks, data center interconnects, and future optical access networks. Single-carrier 400G solutions such as dual-polarization (DP) 16-ary quadrature-amplitude modulation (DP-16QAM), DP-32QAM, and DP-64QAM at typical symbol rates of 64, 51, and 43 GBd, respectively, have been reported and under are standardization.

The next target of DP-64QAM with 50 to 90 GBd for future dual-carrier 1-Tb/s transceivers attracts a significant attention. With high-order modulation formats, higher optical-signal-to-noise-ratio (OSNR) or power requirements become inevitable, which requires more complicated and robust DSP algorithms. Approaches to achieve this goal include constant modulus algorithms (CMA) for channel compensation or blind phase searches (BPS) for carrier recovery. However, these methods lack the capability to mitigate the nonlinear distortions incurred by electrical amplification and fiber nonlinearities. Volterra-based digital nonlinear predistortion requires more than 500 taps which is complex and only used for nonlinearity tolerance increase.

DETAILED DESCRIPTION OF THE EMBODIMENTS

Embodiments disclosed herein employ unsupervised machine-learning in coherent DSP to improve OSNR. For example, a Gaussian mixture model (GMM) enhances the performance of carrier phase estimation (CPE), which increases robustness of a coherent optical transmission system against phase noise.

Figure 1:
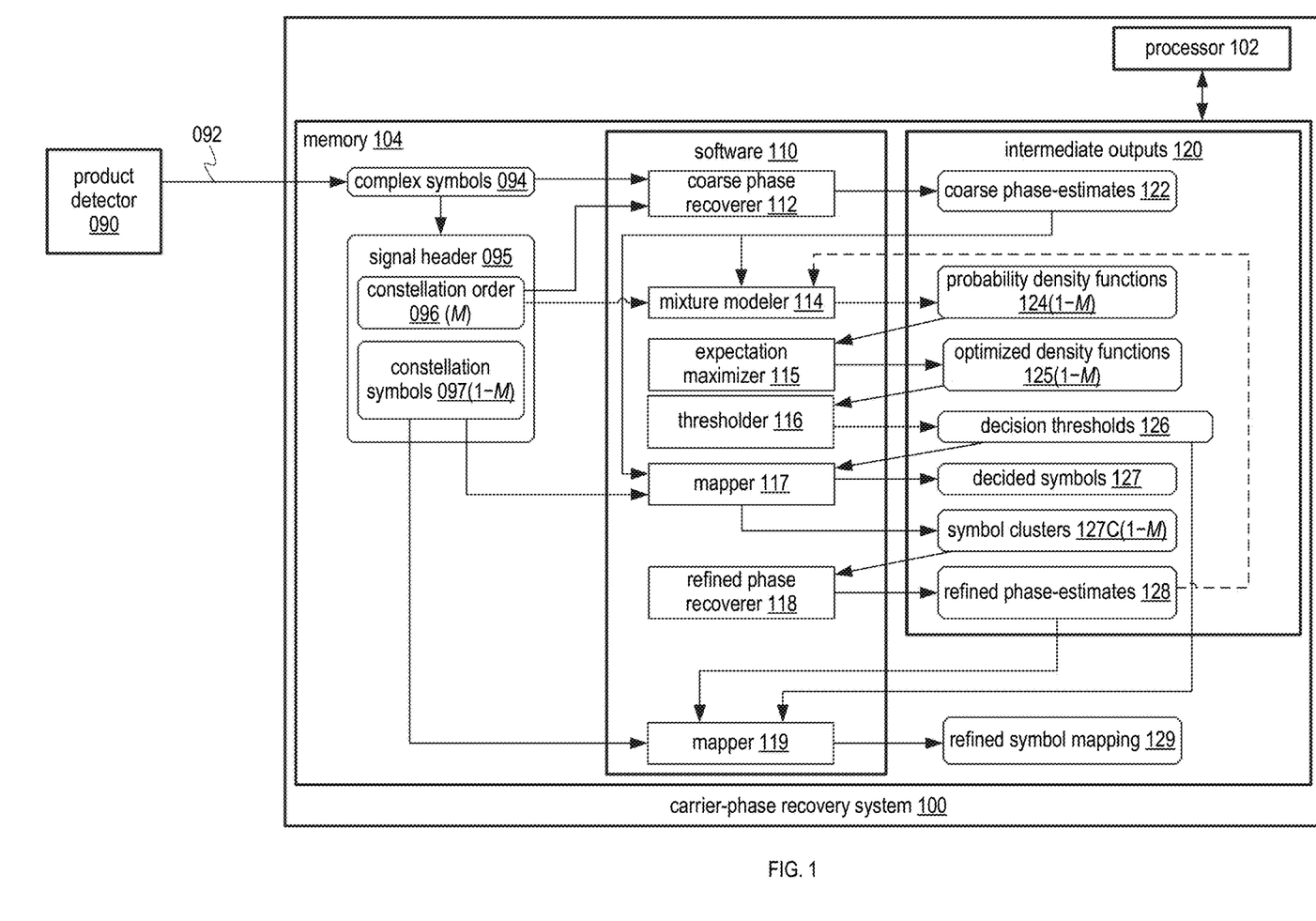
FIG. 1 is a schematic of a carrier-phase recovery system receiving a signal from a product detector, in an embodiment.

FIG. 1 is a schematic of a carrier-phase recovery system 100, hereinafter "system 100," receiving a signal 092 from a product detector 090. In embodiments, product detector 090, also known as a product demodulator, is and/or functions as a coherent demodulator.

System 100 includes a processor 102 communicatively coupled to a memory 104, which stores software 110. Memory 104 stores signal 092 as a plurality of complex symbols 094 and a signal header 095. When signal 092 is modulated per a QAM scheme, signal header 095 may include a constellation order 096 of the modulation scheme, herein also referred to as M, and may include M constellations symbols 097 associated with the QAM scheme. In embodiments, signal 092 is modulated per a dual-polarization QAM scheme. In embodiments, signal 092 is an information-bearing signal (a.k.a. a data-bearing signal) rather than a pilot signal, and complex symbols 094 are information-bearing symbols, and not pilot symbols.

Memory 104 also stores non-transitory computer-readable instructions as software 110. Software 110 includes at least one of a coarse phase recoverer 112, a mixture modeler 114, an expectation maximizer 115, a thresholder 116, a mapper 117, and a refined phase recoverer 118 which output respective intermediate outputs 120. Intermediate outputs 120 includes at least one of coarse phase-estimates 122, probability density functions 124(1-M), optimized probability density functions 125(1-M), decision thresholds 126, decided symbols 127, symbol clusters 127C(1-M), and refined phase-estimates 128. Each decided symbol 127 is one of constellation symbols 097(1-M). In embodiments, software 110 includes a mapper 119, which outputs a refined symbol mapping 129.

When signal 092 is modulated via quadrature amplitude modulation, constellation order 096 corresponds to the order M of a quadrature amplitude modulation. In such cases, constellation order 096 and order M are used interchangeably herein.

Memory 104 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 104 may be integrated into processor 102.

Figure 2:
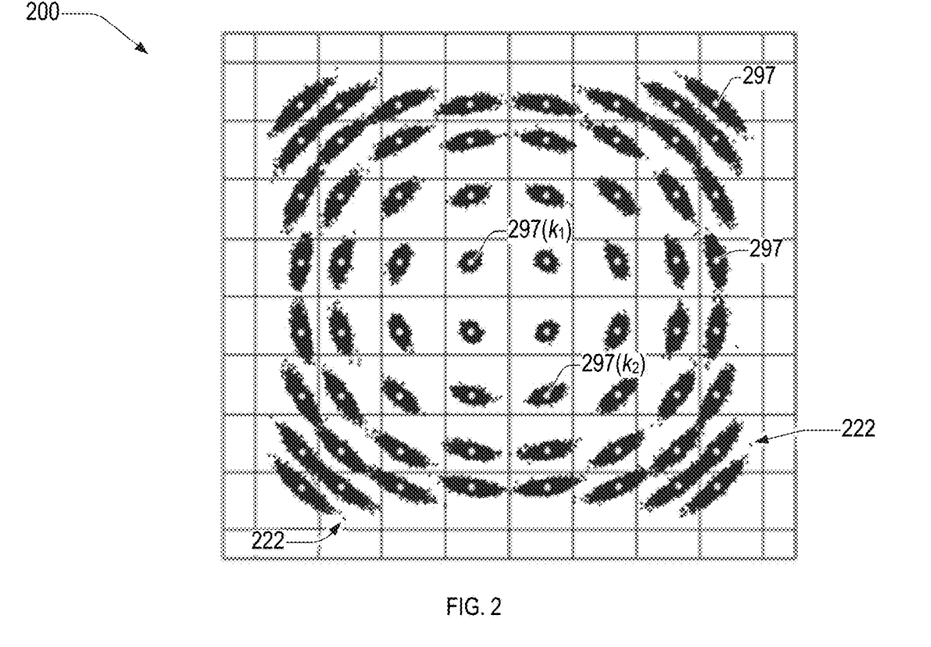
FIG. 2 is a constellation diagram of a 64-QAM signal, the signal being an example of the signal of FIG. 1, in an embodiment.

FIG. 2 is a constellation diagram 200 of a 64-QAM signal. Constellation diagram 200 includes a plurality of coarse phase-estimates 222, each of which is an example of a coarse phase-estimate of coarse phase-estimates 122, FIG. 1. The 64-QAM signal is an example of signal 092, where constellation order 096 is M=64.

Constellation diagram 200 includes symbols 297(1-M), each denoted by a respective white dot of a periodic array thereof, which comprise an ideal constellation diagram associated with the 64-QAM scheme applied to the signal. Each symbol 297 is an example of a respective constellation symbol 097, FIG. 1. As each coarse phase-estimate 222 is clustered about one of M symbols 297, FIG. 2 includes reference numerals for selected outlier coarse phase-estimates 222 that are visibly distinct from a cluster of coarse phase-estimates 222. For clarity of illustration, FIG. 2 includes reference numerals only for selected symbols 297, including symbols $297(k_1)$ and $297(k_2)$. In the following discussion, a k with subscript, $k_1$ and $k_2$ for example, denotes a positive integer less than or equal to M.

Figure 3:
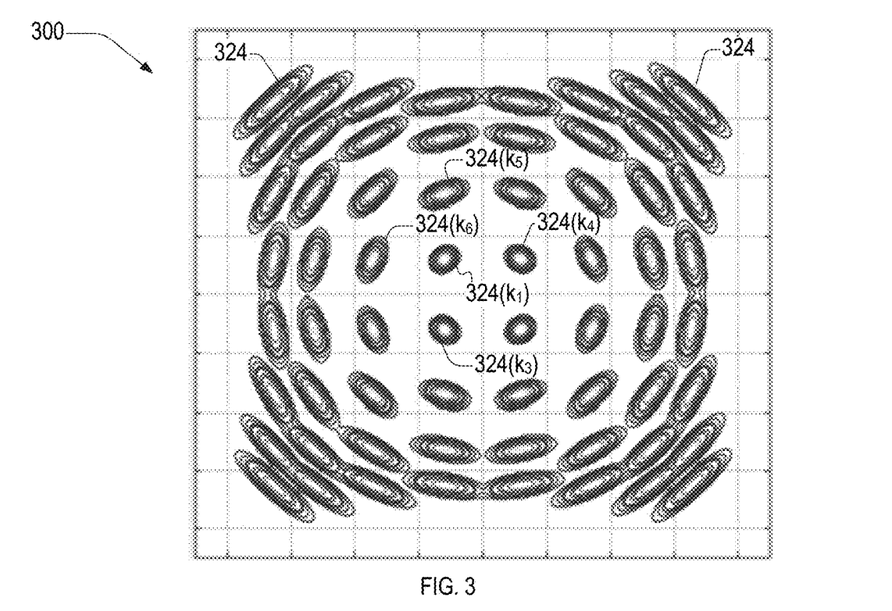
FIG. 3 is a contour plot of a M Gaussian distributions generated by applying a Gaussian mixture model to the plurality of coarse phase-estimates of FIG. 2, in an embodiment.

FIG. 3 is a contour plot 300 of a M Gaussian distributions 324(1-M) generated by applying a Gaussian mixture model to the plurality of coarse phase-estimates 222, FIG. 2. Each Gaussian distribution 324 is an example of a probability density function 124 generated by mixture modeler 114, FIG. 1. In embodiments, each Gaussian distribution 324 has a respective centroid determined by part or all of the plurality of coarse phase-estimates 222. The respective centroids need not be co-located with any of symbols 297. Gaussian distributions 324(1-M) includes Gaussian distribution 324($k_1$) and neighboring Gaussian distributions 324 ($k_3$), 324($k_4$), 324($k_5$), and 324($k_6$). For clarity of illustration, FIG. 3 does not include a reference numeral for each Gaussian distribution 324.

Figure 4:
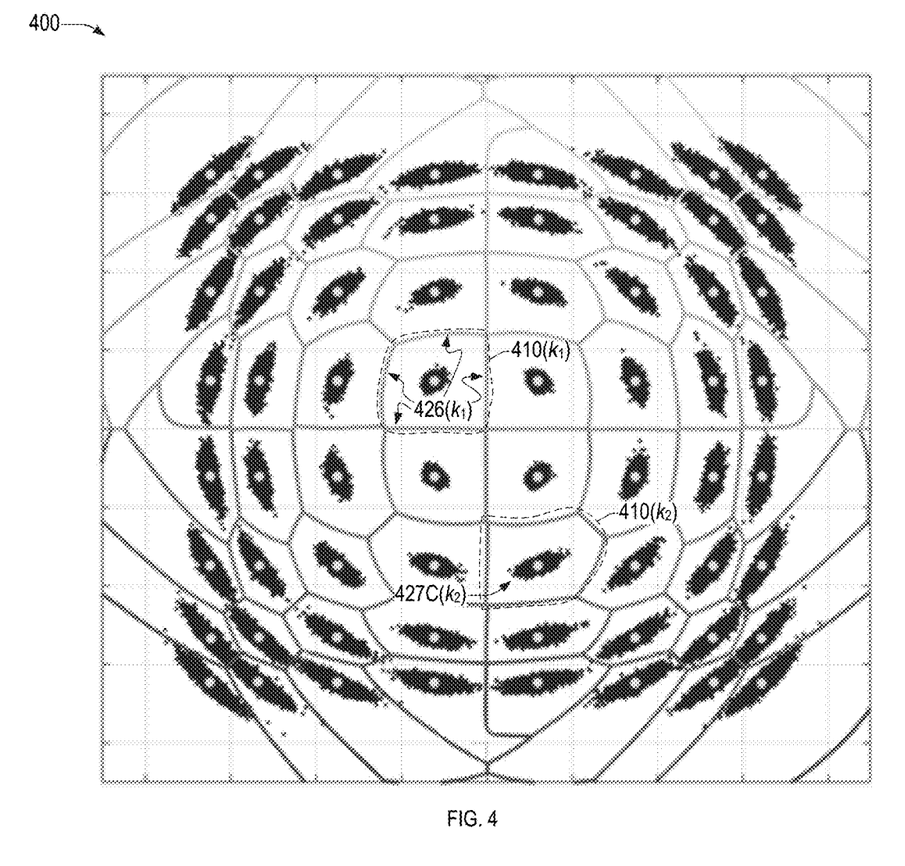
FIG. 4 is a plot illustrating constellation diagram of FIG. 2 with a plurality of decision thresholds superimposed thereon, in an embodiment.

FIG. 4 is a plot 400 illustrating constellation diagram 200 with a plurality of decision thresholds 426(1, 2, . . . , M) superimposed thereon. Each decision threshold 426 is an example of one decision threshold 126 and defines a boundary of a respective one of a plurality of decision regions 410(1, 2, . . . , M) therein. For clarity of illustration, not all decision regions 410 and decision boundaries 420 are labelled in FIG. 4.

FIG. 4 illustrates one decision threshold 426($k_1$), which defines a boundary of decision region 410($k_1$). Each coarse phase-estimate 222 occupying a same decision region 410 is part of one of M symbol clusters 427C. Each symbol cluster 427C(k) is an example of a symbol cluster 127C, FIG. 1, and corresponds to a respective constellation symbol 097(k). For example, a coarse phase-estimate 222 occupying decision region 410($k_1$) is part of cluster 427($k_1$), which corresponds to constellation symbol 097($k_1$). Similarly, a coarse phase-estimate 222 occupying decision region 410($k_2$) is part of cluster 427($k_2$), which corresponds to constellation symbol 097($k_2$).

In embodiments, each decision threshold 426 corresponds to a plurality of lines or curves connecting intersections of adjacent Gaussian distributions 324. In embodiments, decision threshold 4260($k_1$) is determined by intersections of Gaussian distribution 324($k_1$) with each of Gaussian distributions 324($k_3$), 324($k_4$), 324($k_5$), and 324($k_6$) at a pretermined value of a contour surface.

Figure 5:
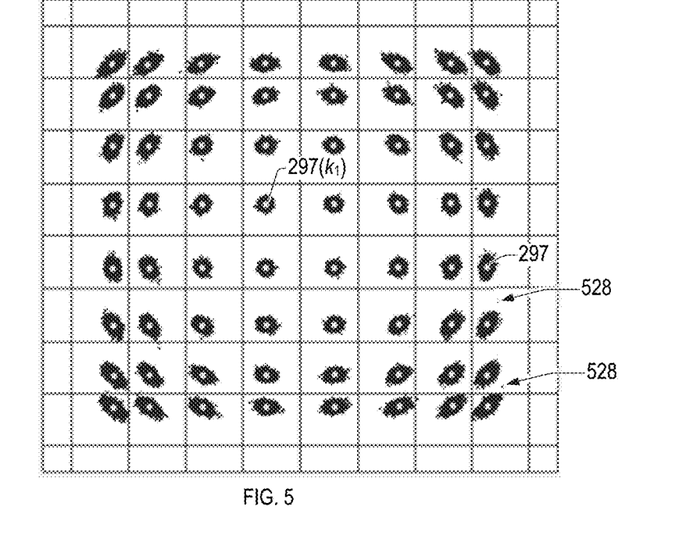
FIG. 5 is a constellation diagram that includes a plurality of refined phase-estimates generated by the carrier-phase recovery system of FIG. 1, in an embodiment.

FIG. 5 is a constellation diagram 500 that includes a plurality of refined phase-estimates 528, each of which is an example of a refined phase-estimate 128. As refined phase-estimates 528 are clustered about one of M symbols 297, FIG. 5 includes reference numerals for selected outlier refined phase-estimates 528 that are visibly distinct from a cluster of refined phase-estimates 528. For clarity of illustration, FIG. 5 includes reference numerals only for selected symbols 297.

Figure 6:
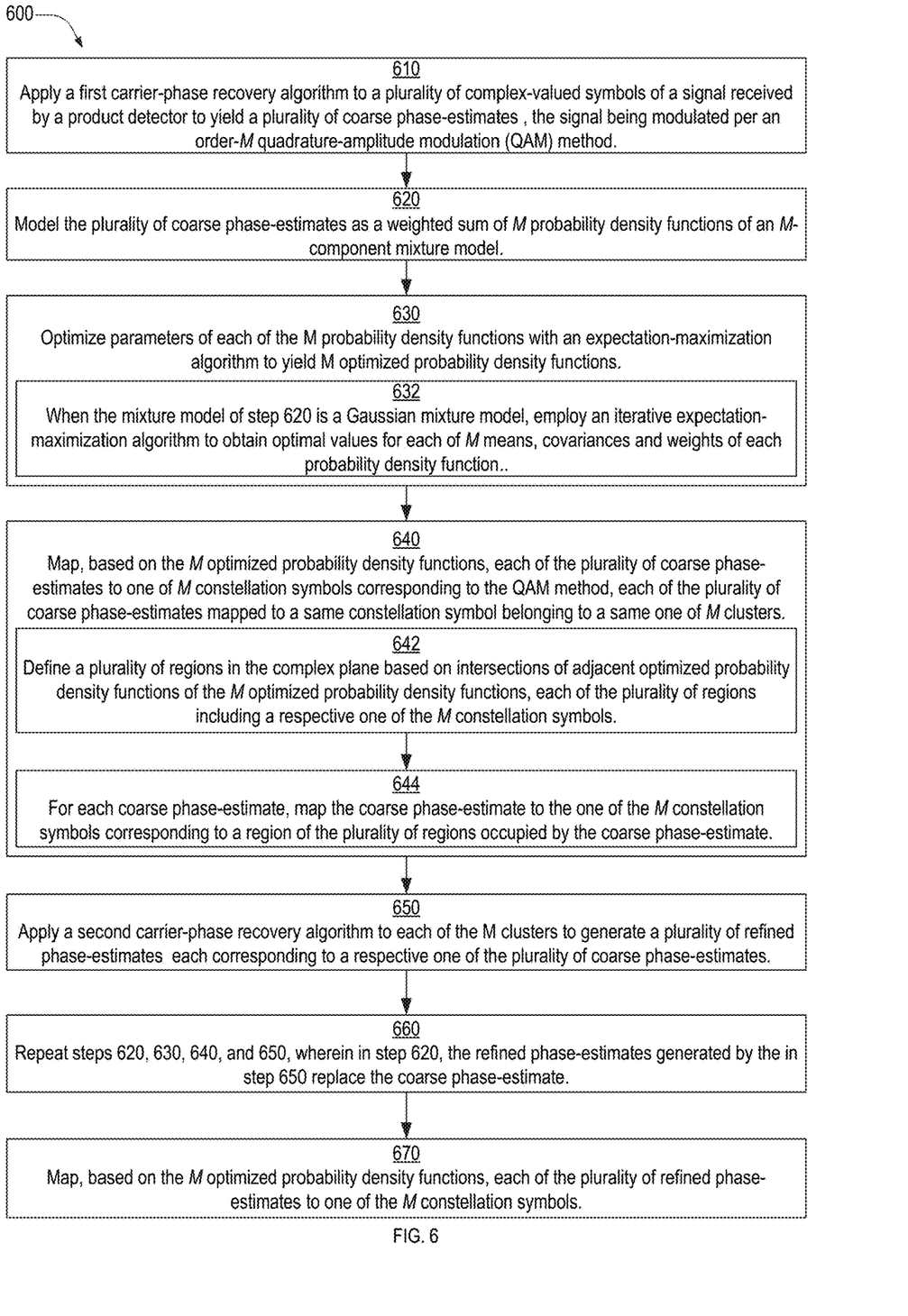
FIG. 6 is a flowchart illustrating a carrier-phase recovery method implementable by the carrier-phase recovery system of FIG. 1, in an embodiment.

FIG. 6 is a flowchart illustrating a carrier-phase recovery method 600. Method 600 includes at least one of steps 610, 620, 630, 640, 650, 660, and 670. In embodiments, method 600 is implemented within one or more aspects of carrier-phase recovery system 100, for example, by processor 102 executing computer-readable instructions of software 110.

Step 610 includes applying a first carrier-phase recovery algorithm to a plurality of complex-valued symbols of a signal received by a product detector to yield a plurality of coarse phase-estimates. The signal is modulated per an order-M quadrature-amplitude modulation (QAM) scheme. In an example of step 610, coarse phase recoverer 112 applies a first carrier-phase recovery algorithm to complex-valued symbols 094 to yield coarse phase-estimates 222, FIG. 2. In embodiments, the first carrier-phase recovery algorithm is a Viterbi-Viterbi Fourth-Power estimator. In embodiments, first carrier-phase recovery algorithm uses fewer than M symbols, fewer than M/2 for example, such as those at $\pi/4+m\pi/2$, where m is a non-negative integer. Without departing from the scope of the embodiments, the first carrier-phase recovery algorithm may be a different feedforward phase estimation scheme, such as a blind-phase search, and not require a pilot signal or pilot symbols.

Step 620 includes modelling the plurality of coarse phase-estimates as a weighted sum of M probability density functions of an M-component mixture model. In an example of step 620, mixture modeler 114 models coarse phase-estimates 222 as a weighted sum of M Gaussian distributions 324, FIG. 3. In embodiments, mixture modeler 114 employs a Gaussian mixture model, such that each of the M Gaussian distributions 324 is a respective Gaussian distribution. The parameters of the Gaussian mixture model include a mean, a covariance, and a weight of each of Gaussian distributions 324.

Step 630 includes optimizing parameters of each of the M probability density functions with an expectation-maximization algorithm to yield M optimized probability density functions. In an example of step 630, expectation maximizer 115 optimizes parameters of Gaussian distributions 324 to yield M optimized probability density functions 125.

In embodiments, step 630 includes step 632. Step 632 includes employing an iterative expectation-maximization algorithm to obtain optimal values for each of the M means, covariances and weights. In an example of step 632, each of the M Gaussian distributions 324 is a respective Gaussian distribution, and expectation maximizer 115 optimizes parameters of Gaussian distributions 324 to obtain optimal values for each of the M means, covariances and weights corresponding to optimized probability density functions 125.

Step 640 includes mapping, based on the M optimized probability density functions, each of the plurality of coarse phase-estimates to one of M constellation symbols corresponding to the QAM scheme. Each of the plurality of coarse phase-estimates mapped to a same constellation symbol belongs to a same one of M clusters. In an example of step 640, mapper 117 maps, based on optimized probability density functions 125, each of coarse phase-estimates 222 to a decided symbol 127. As stated above, each decided symbol 127 is one of constellation symbols 097(1-M). Each of the plurality of coarse phase-estimates 222 mapped to a same decided symbol 127 belongs to a same one of M symbol clusters 427C.

In embodiments, step 640 includes steps 642 and 644. Step 642 includes defining a plurality of regions in the complex plane based on intersections of adjacent optimized probability density functions of the M optimized probability density functions. Each of the plurality of regions include a respective one of the M constellation symbols. In an example of step 642, thresholder 116 defines regions 410 based on intersections of adjacent optimized probability density functions 125.

Step 644 includes, for each of the plurality of coarse phase-estimates, mapping the coarse phase-estimate to the one of the M constellation symbols corresponding to a region of the plurality of regions occupied by the coarse phase-estimate. In an example of step 644, mapper 117 maps (i) each of the coarse phase-estimate 222 within decision region 410($k_1$) to symbol 297($k_1$) within decision region 410($k_1$) and (ii) each the coarse phase-estimate 222 within decision region 410($k_2$) to symbol 297($k_2$) within decision region 410($k_2$).

Step 650 includes applying a second carrier-phase recovery algorithm to each of the M clusters to generate a plurality of refined phase-estimates each corresponding to a respective one of the plurality of coarse phase-estimates. In embodiments, the second carrier-phase recovery algorithm is a Viterbi-Viterbi Fourth-Power estimator. Without departing from the scope of the embodiments, the second carrier-phase recovery algorithm may be a different feedforward phase estimation scheme, such as a blind-phase search, and not require a pilot signal or pilot symbols. In an example of step 650, refined phase recoverer 118 applies a second carrier-phase recovery algorithm to each of the M symbol clusters 427C to generate refined phase-estimates 528 each corresponding to a respective one of the plurality of coarse phase-estimates 222.

Step 660 includes repeating steps 620, 630, 640, and 650, wherein in step 620, the refined phase-estimates generated in step 650 replace the coarse phase-estimate. In an example of step 660, processor 102 executes computer-readable instructions of software 110 to repeat steps 620, 630, 640, and 650, wherein in step 620, the refined phase-estimates 528 replace coarse phase-estimate 222 as inputs to mixture modeler 114.

Step 670 includes mapping, based on the M optimized probability density functions, each of the plurality of refined phase-estimates to one of the M constellation symbols. In an example of step 670, mapper 119 maps each refined phase-estimate 528 to one of the M constellation symbols 097.

Example Dual Polarization 64-QAM Transmission Experiment

Figure 7:
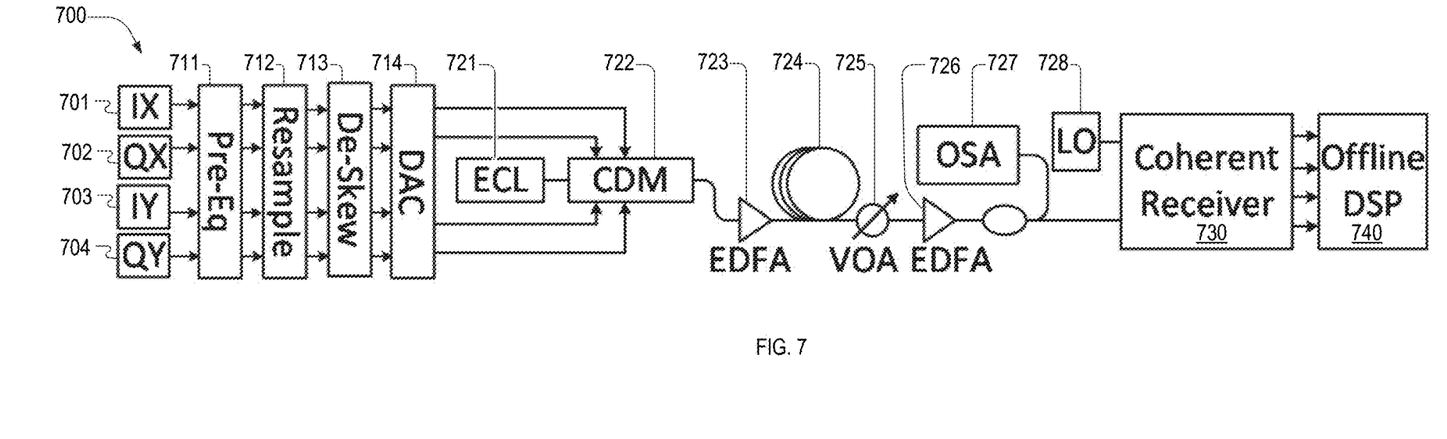
FIG. 7 is a schematic of a testbed used in experiments conducted to verify the performance embodiments of carrier-phase recovery system of FIG. 1.

FIG. 7 is a schematic of a testbed 700 used in DP-64QAM transmission experiments conducted to further verify the performance embodiments of carrier-phase recovery system 100 and carrier-phase recovery method 600. Electrical components of testbed 700 include an equalizer 711, a sampler 712, a skew compensator 713, and a digital-to-analog converter 714. Optical components of testbed 700 include an external-cavity laser 721, a coherent driver modulator 722, a boost erbium-doped fiber amplifier (EDFA) 723, a single-mode fiber 724, a variable optical attenuator 725, and a second erbium-doped fiber amplifier 726. Testbed 700 also includes an optical spectrum analyzer 727, a local oscillator 728, a coherent receiver 730, and an offline digital signal processor 740. Offline digital signal processor 740 is an example of carrier-phase recovery system 100. The combination of local oscillator 728 and coherent receiver 730 is an example of product detector 090.

Figure 8:
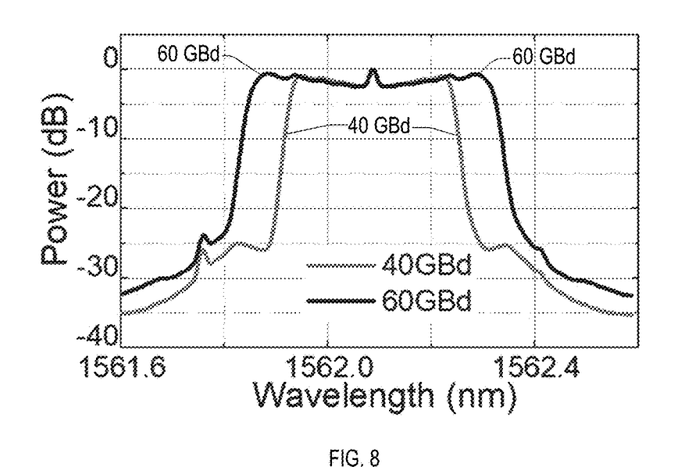
FIG. 8 is plot of optical spectra of carrier signals of the testbed of FIG. 7.

Four streams 701-704 of 8-ary pulse-amplitude modulation (8PAM) symbols are generated at 40 GBd and 60 GBd on respective carrier signals having optical spectra shown in FIG. 8. Streams 701-704 are examples of signal 092, FIG. 1. Equalizer 711 performs pre-equalization to flatten the channel response of the whole link. Sampler 712 resamples the symbols to match the sampling rate of 80-GSa/s for digital-to-analog converter 714. Skew compensator 713 pre-compensates skews among streams 701-704 before sending data thereof to digital-to-analog converter 714.

External-cavity laser 721 emits an optical signal, center wavelength 1562.5 nm, which is fed into coherent driver modulator 722 with 3-dB bandwidth around 35 GHz, which is used for DP-64QAM modulation. The optical signal then is amplified by boost EDFA 723 and transmitted over single mode fiber 724, which is 70-km long in testbed 700. At the receiver site, the propagation loss is compensated by a preamplifier and signals are detected by coherent receiver 730 and demodulated by offline digital signal processor 740.

Combinations of Features

Features described above as well as those claimed below may be combined in various ways without departing from the scope hereof. The following enumerated examples illustrate some possible, non-limiting combinations:

(A1) A carrier-phase recovery method includes: (i) applying a first carrier-phase recovery algorithm to a plurality of complex-valued symbols of a signal received by a product detector to yield a plurality of coarse phase-estimates, the signal being modulated per an order-M quadrature-amplitude modulation (QAM) scheme; (ii) modelling the plurality of coarse phase-estimates as a weighted sum of M probability density functions of an M-component mixture model; (iii) optimizing parameters of each of the M probability density functions with an expectation-maximization algorithm to yield M optimized probability density functions; (iv) mapping, based on the M optimized probability density functions, each of the plurality of coarse phase-estimates to one of M constellation symbols corresponding to the QAM scheme, each of the plurality of coarse phase-estimates mapped to a same constellation symbol belonging to a same one of M clusters; (v) applying a second carrier-phase recovery algorithm to each of the M clusters to generate a plurality of refined phase-estimates each corresponding to a respective one of the plurality of coarse phase-estimates; and (vi) mapping, based on the M optimized probability density functions, each of the plurality of refined phase-estimates to one of the M constellation symbols.

(A2) In method (A1), when each of the plurality of coarse phase-estimates includes a coordinate pair in a complex plane of a constellation diagram representing the signal, the method may further include: defining a plurality of regions in the complex plane based on intersections of adjacent optimized probability density functions of the M optimized probability density functions, each of the plurality of regions including a respective one of the M constellation symbols; and, for each of the plurality of coarse phase-estimates, mapping the coarse phase-estimate to the one of the M constellation symbols corresponding to a region of the plurality of regions occupied by the coarse phase-estimate.

(A3) Any of methods (A1) and (A2) may further include, after applying a second carrier-phase recovery algorithm: repeating steps of modelling, optimizing, mapping each of the plurality of coarse phase-estimates, and applying the second carrier-phase recovery algorithm, wherein in the step of modelling, the refined phase-estimates generated by the second-carrier-phase recovery algorithm replace the coarse phase-estimates.

(A4) In any of methods (A1)-(A3), when the mixture model is a Gaussian mixture model, each of the M probability density functions is a respective Gaussian distribution, and the parameters of the mixture model include a mean, a covariance, and a weight of each of the Gaussian distributions, the step of optimizing may include employing an iterative expectation-maximization algorithm to obtain optimal values for each of the M means, covariances and weights.

(A5) In any of methods (A1)-(A4), in the step of applying the first carrier-phase recovery algorithm, the first carrier-phase recovery algorithm may use fewer than M symbols.

(A6) In any of methods (A1)-(A5), in the step of applying, plurality of complex-valued symbols may be less than ten thousand in number.

(A7) In any of methods (A1)-(A6), in the step of applying, the carrier-phase recovery algorithm may be a Viterbi-Viterbi Fourth-Power estimator.

(A8) In any of methods (A1)-(A7), the quadrature-amplitude modulation scheme may be a dual-polarization QAM scheme.

(B1) A carrier-phase recovery system includes a processor and a memory. The memory is adapted to store a plurality of complex-valued symbols of a signal and storing non-transitory computer-readable instructions that, when executed by the processor, control the processor to execute any of the methods (A1)-(A8).

Changes may be made in the above carrier-phase recovery methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present carrier-phase recovery method and system, which, as a matter of language, might be said to fall therebetween.

The invention claimed is:

1. A carrier-phase recovery method comprising:
    applying a first carrier-phase recovery algorithm to a plurality of complex-valued symbols of a signal received by a product detector to yield a plurality of coarse phase-estimates;
    modelling the plurality of coarse phase-estimates as a weighted sum of a plurality of probability density functions;
    optimizing parameters of each of the plurality of probability density functions with an expectation-maximization algorithm to yield a plurality of optimized probability density functions;
    mapping, based on the plurality of optimized probability density functions, each of the plurality of coarse phase-estimates to one of a plurality of constellation symbols, each of the plurality of coarse phase-estimates mapped to a same constellation symbol belonging to a same one of a plurality of clusters;
    applying a second carrier-phase recovery algorithm to each of the plurality of clusters to generate a plurality of refined phase-estimates each corresponding to a respective one of the plurality of coarse phase-estimates; and
    mapping, based on the plurality of optimized probability density functions, each of the plurality of refined phase-estimates to one of the plurality of constellation symbols.

2. The method of claim 1, each of the plurality of coarse phase-estimates including a coordinate pair in a complex plane of a constellation diagram representing the signal, the method further comprising:
    defining a plurality of regions in the complex plane based on intersections of adjacent optimized probability density functions of the plurality of optimized probability density functions, each of the plurality of regions including a respective one of the plurality of constellation symbols; and,
    for each of the plurality of coarse phase-estimates, mapping the coarse phase-estimate to the one of the plurality of constellation symbols corresponding to a region of the plurality of regions occupied by the coarse phase-estimate.

3. The method of claim 1, further comprising, after applying the second carrier-phase recovery algorithm:
    repeating steps of modelling, optimizing, mapping each of the plurality of coarse phase-estimates, and applying the second carrier-phase recovery algorithm, wherein in the step of modelling, the refined phase-estimates generated by the second carrier-phase recovery algorithm replace the coarse phase-estimates.

4. The method of claim 1,
    in the step of modeling, each of the plurality of probability density functions being of a Gaussian mixture model and being a respective Gaussian distribution, the parameters of the Gaussian mixture model including a mean, a covariance, and a weight of each respective Gaussian distribution; and
    optimizing including employing an iterative expectation-maximization algorithm to obtain optimal values for each mean, covariance, and weight of each respective Gaussian distribution.

5. The method of claim 1, in the step of applying, the plurality of complex-valued symbols being less than ten thousand in number.

6. The method of claim 1, in the steps of applying, the carrier-phase recovery algorithm being a Viterbi-Viterbi Fourth-Power estimator.

7. The carrier-phase recovery method of claim 1, in the step of applying the first carrier-phase recovery algorithm, the signal being modulated per an order-M quadrature-amplitude modulation scheme.

8. The method of claim 7, in the step of mapping, each of the plurality of constellation symbols corresponding to the quadrature-amplitude modulation scheme.

9. The method of claim 7, in the step of modelling, each of the plurality of probability density functions, M in number being of an M-component mixture model.

10. The method of claim 1,
    in the step of modeling, the mixture model being a Gaussian mixture model, each of the M probability density functions being a respective Gaussian distribution, the parameters of the mixture model including a mean, a covariance, and a weight of each of the Gaussian distributions; and
    optimizing including employing an iterative expectation-maximization algorithm to obtain optimal values for each of the M means, covariances and weights.

11. The method of claim 7, in the step of applying the first carrier-phase recovery algorithm, the first carrier-phase recovery algorithm using fewer than M symbols.

12. The method of claim 7, the quadrature-amplitude modulation scheme being a dual-polarization quadrature-amplitude modulation scheme.

13. A carrier-phase recovery system:
    a processor; and
    memory adapted to store a plurality of complex-valued symbols of a signal and storing non-transitory computer-readable instructions that, when executed by the processor, control the processor to:
        apply a first carrier-phase recovery algorithm to the plurality of complex-valued symbols to yield a plurality of coarse phase-estimates;
        model the plurality of coarse phase-estimates as a weighted sum of a plurality of probability density functions;
        optimize parameters of each of the plurality of probability density functions with an expectation-maximization algorithm to yield a plurality of optimized probability density functions;
        map, based on the plurality of optimized probability density functions, each of the plurality of coarse phase-estimates to one of a plurality of constellation symbols, each of the plurality of coarse phase-estimates mapped to a same constellation symbol belonging to a same one of a plurality of clusters;

apply a second carrier-phase recovery algorithm to each of the plurality of clusters to generate a plurality of refined phase-estimates each corresponding to a respective one of the plurality of coarse phase-estimates; and map, based on the plurality of optimized probability density functions, each of the plurality of refined phase-estimates to one of the plurality of constellation symbols.

14. The carrier-phase recovery system of claim 13, each of the plurality of coarse phase-estimates including a coordinate pair in a complex plane of a constellation diagram representing the signal, the memory further storing non-transitory computer-readable instructions that, when executed by the processor, control the processor to:

define a plurality of regions in the complex plane based on intersections of adjacent optimized probability density functions of the plurality of optimized probability density functions, each of the plurality of regions including a respective one of the plurality of constellation symbols; and, for each of the plurality of coarse phase-estimates, map the coarse phase-estimate to the one of the plurality of constellation symbols corresponding to a region of the plurality of regions occupied by the coarse phase-estimate.

15. The carrier-phase recovery system of claim 13, the memory further storing non-transitory computer-readable instructions that, when executed by the processor, control the processor to, after applying the second carrier-phase recovery algorithm:

repeat steps of modelling, optimizing, mapping each of the plurality of coarse phase-estimates, and apply the second carrier-phase recovery algorithm, wherein in the step of modelling, the refined phase-estimates generated by the second carrier-phase recovery algorithm replace the coarse phase-estimates.

16. The carrier-phase recovery system of claim 13, each of the plurality of probability density functions being of a Gaussian mixture model and being a respective Gaussian distribution, the parameters of the Gaussian mixture model including a mean, a covariance, and a weight of each respective Gaussian distribution, and the memory further storing non-transitory computer-readable instructions that, when executed by the processor, control the processor to, when optimizing parameters:

employ an iterative expectation-maximization algorithm to obtain optimal values for each mean, covariance, and weight of each respective Gaussian distribution.

17. The carrier-phase recovery system of claim 13, the plurality of complex-valued symbols being less than ten thousand in number.

18. The carrier-phase recovery system of claim 13, the carrier-phase recovery algorithm being a Viterbi-Viterbi Fourth-Power estimator.

19. The carrier-phase recovery system of claim 13, the signal being modulated per an order-M quadrature-amplitude modulation scheme.

20. The carrier-phase recovery system of claim 19, the first carrier-phase recovery algorithm using fewer than M symbols.

21. The carrier-phase recovery system of claim 19, the quadrature-amplitude modulation scheme being a dual-polarization quadrature-amplitude modulation scheme.

22. The carrier-phase recovery system of claim 13, each of the plurality of constellation symbols corresponding to the quadrature-amplitude modulation scheme.

23. The carrier-phase recovery system of claim 13, each of the plurality of probability density functions, M in number, being of an M-component mixture model.

24. The carrier-phase recovery system of claim 23, the mixture model being a Gaussian mixture model, each of the M probability density functions being a respective Gaussian distribution, the parameters of the mixture model including a mean, a covariance, and a weight of each of the Gaussian distributions, and the memory further storing non-transitory computer-readable instructions that, when executed by the processor, control the processor to, when optimizing parameters:

employ an iterative expectation-maximization algorithm to obtain optimal values for each of the M means, covariances and weights.

* * * * *